July 22, 1952     S. L. JEZERSKI     2,603,901
FISHING LURE
Filed Feb. 12, 1949     2 SHEETS—SHEET 1
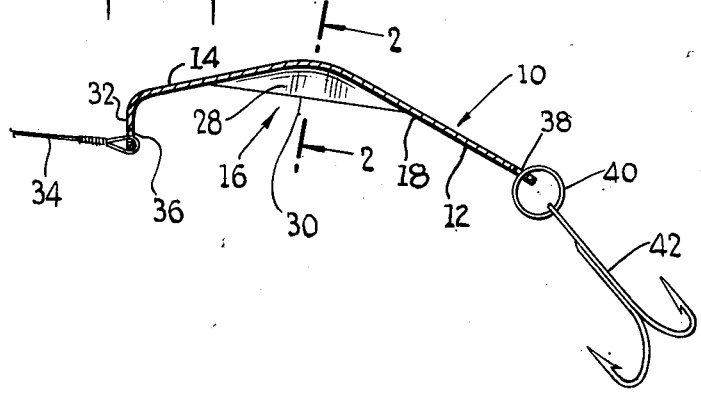
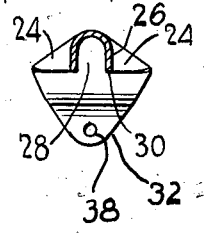
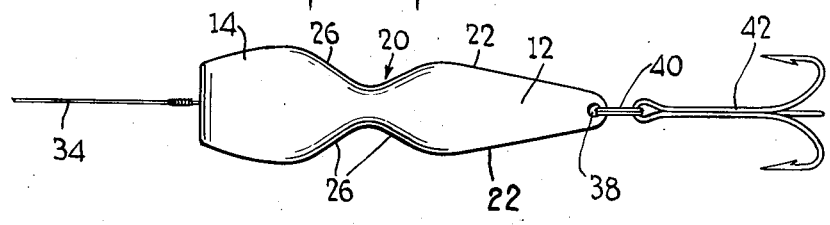
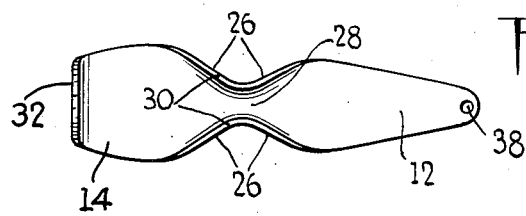
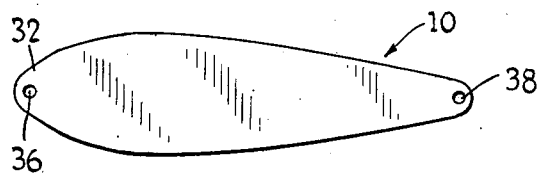
INVENTOR.
STEPHEN L. JEZERSKI
BY Henry L. Burkitt
ATTORNEY July 22, 1952
S. L. JEZERSKI
2,603,901
FISHING LURE
Filed Feb. 12, 1949
2 SHEETS—SHEET 2
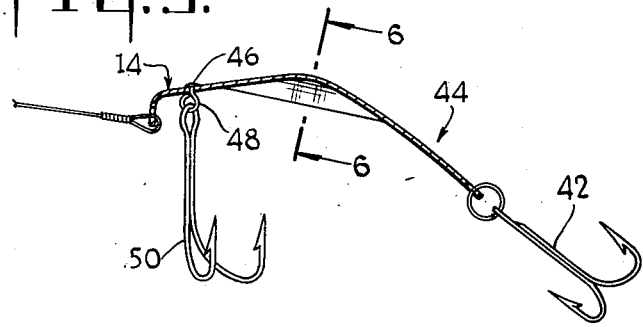
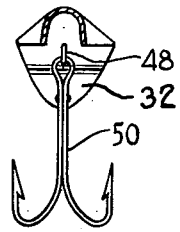
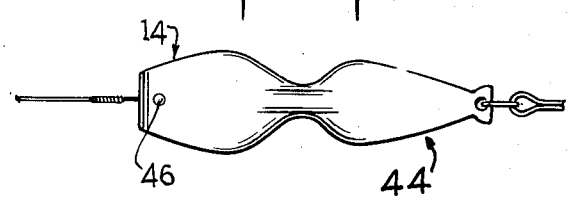
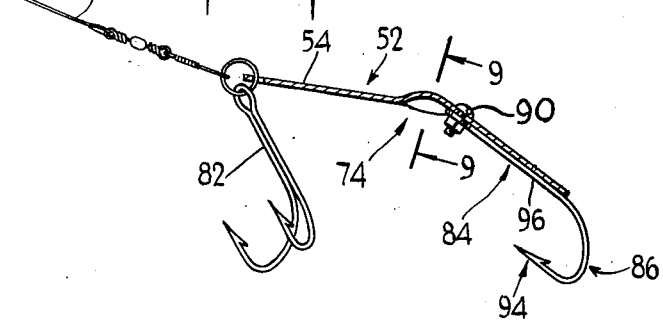
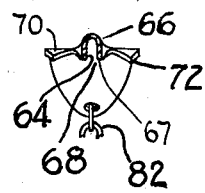
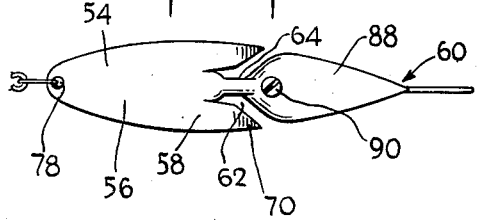
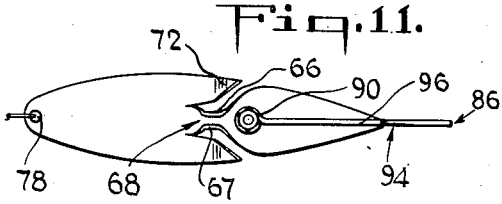
INVENTOR.
STEPHEN L. JEZERSKI
BY
Henry L. Burkitt
ATTORNEY Patented July 22, 1952

2,603,901

UNITED STATES PATENT OFFICE 2,603,901

FISHING LURE

Stephen L. Jezerski, New Britain, Conn.

Application February 12, 1949, Serial No. 75,989

8 Claims. (Cl. 43—42.5)

This invention relates to fishing lures.

One of the important things sought in connection with a fishing lure is that it simulate in the water, the action of live bait as much as possible. Thus, regardless of size, whether for small fish, when the lures should be small, or for large fish, when the lure may be appreciably larger, the lure must be capable of simulating as closely as possible at all times during its use for fishing, the movements in the water which a fish of that size would effect, and not to produce the effect of a piece of metal moving through the water. Ordinary reflecting surfaces for bodies of this type might, in fact, detract from the illusion they are intended to produce on the part of the fish being baited. Fish ordinarily might not be attracted by the unnatural reflection obtained from such members. If that surface is so designed that it must follow certain desired movements by reason of the formation of the lure, and thus the reflected light will not be constant, but actually will have the effect, as it moves through the water, which resembles the glint of the sides of the bait fish, the result sought will have been attained.

In addition to this, means must be provided so that the hooks upon which the fish are to be caught shall be so located that they will be swallowed by the fish to be baited when such fish attempt to swallow the lure.

It is an object of the invention to provide a fishing lure so constructed that it will simulate in moving through the water the lateral and diving movements of a fish bait to a great degree.

It is an object of the invention to provide a fish lure which, while simulating the movement of live fish bait, will position hooks so that they cannot under most circumstances be missed by a fish attempting to swallow the bait of the lure, but will be swallowed.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which are disclosed such practical constructions, Fig. 1 is a vertical, longitudinal cross-sectional view, taken through an embodiment of a fishing lure embodying features of the invention, the line and the hook assembly being shown in elevation;

Fig. 1a is a plan view of the plate from which the construction shown in Fig. 1 is formed;

Fig. 2 is a transverse vertical cross-sectional view, substantially on the line 2—2 of Fig. 1, the lines not being shown;

Fig. 3 is a plan view of the embodiment shown in Fig. 1;

Fig. 4 is a bottom plan view of the construction shown in Fig. 3, the line and the hook being removed;

Fig. 5 is a view, similar to Fig. 1, of a modified construction;

Fig. 6 is a vertical cross-sectional view, substantially on the line 6—6 of Fig. 5;

Fig. 7 is a plan view of the modification shown in Figs. 5 and 6;

Fig. 8 is a view similar to Figs. 1 and 5 of a further modified construction, the hook and the line being shown in elevation;

Fig. 9 is a vertical cross-sectional view, substantially on the line 9—9 of Fig. 8, the hook being broken away;

Fig. 10 is a plan view of the construction shown in Fig. 8, the line being broken away; and Fig. 11 is a bottom plan view of the construction of Fig. 10.

The invention lends itself to illustration in various forms. In Figs. 1 to 4, a modification illustrating the invention is constructed from a plate 10, which may be formed from flat stock cut into oval form, as illustrated in Fig. 1a. The dimensions of plate 10 are to be determined by those of the particular bait fish to be simulated. Thus, the size of plate 10 will be determined according to the fish to be baited, which will determine the nature of the bait to be used. The structure of the lure to be produced will remain substantially the same, compensation being provided for variations in size; therefore, the lure may be provided in various sizes.

The narrower portion 12 of the oval of plate 10 is disposed to be the tail of the lure; the larger portion 14 of the lure thus is disposed to be the head portion. Plate 10 is bent to a slight degree out of its original plane, having a sufficient curvature imparted thereto to provide a slight concavity 16 at the underside 18 of the plate. The plate, substantially at the mid-sections 20 of the lateral edges 22, is pressed inwardly and downwardly into concavity 16 and out of the normal lines forming edges 22 at mid-sections 20. Thus a pair of recesses 24 are formed by arcuate walls 26 formed by the deformation of edges 22. A groove 28 is also produced between walls 26 within concavity 16. The mere bending of edges 22 downwardly and into the concavity has not been found sufficient for all purposes of this invention; it is necessary to remove some of the metal of edges 22 at walls 26 down to surface 30 which are substantially of a common contouring, although not necessarily planar. This contouring of surfaces 30 may approach closely the spherical contouring of plate 10 at the bent portion; the radius of curvature of surfaces 30, thus formed, is very large, closely approaching infinity, that is, close to the characteristics of a plane. This result can be produced in any desired manner, as, for instance, by filing or grinding off those edges 22 which have been bent from the normal contouring to form groove 28. This operation will produce surfaces 30 which will fillet smoothly into edges 22 where walls 26 disappear.

This formation of surfaces 30 on the end faces of walls 26 has been found important in causing the desired movement of the lure in the water, and to assure that the lure will not tend to spin as it is drawn through the water. This formation has been found to maintain the lure in a substantially steady position while it merely wobbles or oscillates within a short arc.

At the end of the lure defining larger portion 14, plate 10 is bent sharply downwardly to produce an end wall 32, which then serves as the front wall of the lure. As the lure is drawn through the water, wall 32 is acted upon by its motion through the water in the same way as the head of a fish. The end wall accounts in good measure for a high degree of stability, and serves to maintain the lure against the spinning which normally would occur, but which would be wholly dissimilar to the actual motion of the fish in the water, since the fish muscularly stabilizes itself. Wall 32 additionally serves to effect ducking and diving of the lure which further adds to the proper simulation of the movement of a fish in the water. A line 34 may be attached to the lure at an opening 36 provided in wall 32 for that purpose.

In an opening 38, properly formed in the narrow or smaller portion 12, may be positioned a ring 40 for the reception of a hook 42.

In Figs. 5 to 7, a modified lure structure 44 is illustrated. In structure 44, in addition to hook 42, a rivet 46 is secured in place in portion 14. An eye 48 may be provided as a part of this rivet to receive a hook 50. In other details, structure 44 is substantially the same as the modification shown in Fig. 1.

In Figs. 8 to 11, a differently modified lure structure 52 is illustrated. In structure 52, the lure is formed from a plate 54 which has a larger portion 56, the greatest width of which is approximately at the mid-section 58, from which it tapers down sharply to tail 60. At midsection 58, the plate material may be formed, as, for instance, by being cut away, to provide a pair of slots 62. The edges 64, formed by cutting these slots, are bent downwardly and inwardly, in a manner similar to that followed in forming groove 28 in plate 10, thus defining walls 66, as shown in Fig. 11. Walls 66 may be finished down, as described for walls 26, to provide surfaces 67 similar in effect to surfaces 30. Since the distance between the inner edges of slots 64 is less than the distance across the original plate before it is bent, groove 68, between walls 66, will be of relatively small extent. Since walls 66 will have substantially the same general form as walls 26, substantially identical results as to the motion of the lure will ensue as the lure is drawn through the water.

By forming slots 62, wings or fins 70 are defined by the metal of mid-section 58 which is not cut away. The end portions 72 of fins 70 may be bent downwardly, substantially into the concavity 74 formed by the bending of plate 54 in a manner similar to that in which plate 10 is bent to form concavity 16.

At the forward or larger end 56 of plate 54, there may be provided an opening 78 which may be used for the purpose of attaching a line 80, or for the purpose of securing a hook 82 in place, or, as shown, for both purposes.

The body 84 of a hook 86 may be secured to plate 54 immediately at groove 68, and along the narrow portion 88 of the plate. The hook may be held in place by a rivet 90 which may be passed through the body of the plate at that point. If desired, the head of the rivet may be ornamented, as, for instance, by a jewel or a piece of artificial glass, which, in such case, simulates the eye of a bait fish. Such jewel may actually be the head of the rivet. Hook 86 may extend away from the rivet, rearwardly along the body of the lure, and then terminate in a bent end portion 94 carrying the actual barb, the bent end and the barb being free of the body of the lure. That portion 96 of hook 86 which extends away from the rivet may be held rigidly in position against the body of the lure either by the pressure from the rivet, or by soldering, brazing or otherwise securing the hook to plate 54. When a fish approaches this lure from the rear or the side, in the usual manner, its attempt to swallow the lure will result in its swallowing hook 86.

Fins 70 and groove 68 function to produce results substantially the same as those resulting from groove 28 and its walls, in the structure shown in Figs. 1 to 4.

Many other changes could be effected in the particular constructions, and in the methods of use and construction, and in specific details thereof, hereinbefore set forth without substantially departing from the invention defined in the claims, the specific description being merely of embodiments capable of illustrating certain principles of the invention.

What is claimed as new and useful is:

1. A fishing lure, comprising a substantially rigid plate member having a general outline in plan of substantially oval shape, the member being narrow with relation to its length, and the plate having portions at its ends substantially flat throughout the length of such portions, and a portion approximately midway of the length of the plate member the transverse cross-section of which is rounded, the end portions forming an obtuse angle to produce a concavity longitudinally at the mid-portion, the mid-portion having inwardly extending walls of sufficient extent to define a restricted passage opening in the general direction of the concavity, parts of one of the flat portions extending past the inwardly extending walls and defining with said walls slots at an acute angle to each other, and one wall of each slot being one of the inwardly extending walls.

2. A fishing lure, comprising a substantially rigid plate having a general outline in plan of substantially oval shape, the plate being narrow with relation to its length, and the plate having an intermediate curved portion and flat portions merging from the intermediate portion on opposite sides thereof to form a longitudinal concavity, the flat portions being at an obtuse angle to each other, the transverse cross-section of the intermediate portion being concave, the intermediate portion having inwardly extending walls of sufficient extent to define a restricted passage opening in the general direction of the longitudinal concavity, the free edges of said walls being spaced a substantial distance throughout its entire extent inwardly of a common plane of the outer ends of the flat portions.

3. A fishing lure, comprising a substantially rigid plate having a general outline in plan of substantially oval shape, the plate being narrow with relation to its length, and the plate having an intermediate curved portion and flat portions merging from the intermediate portion on opposite sides thereof to form a longitudinal concavity, the flat portions being at an obtuse angle to each other, the opposed edges of the plate at the intermediate portion extending sharply downwardly and inwardly out of said substantially oval outline to provide inwardly extending walls of sufficient extent to define a restricted passage opening in the general direction of the longitudinal concavity so that the transverse cross-section of the intermediate portion is concave, the free edges of said walls being spaced a substantial distance throughout its entire extent inwardly of a common plane of the outer ends of the flat portions.

4. A fishing lure, comprising a substantially rigid plate having a general outline in plan of substantially oval shape and of a length and width approximately those of a bait fish, the plate being narrow with relation to its length, and the plate having an intermediate curved portion and flat portions merging from the intermediate portion on opposite sides thereof to form a longitudinal concavity, the flat portions being at an obtuse angle to each other, the transverse cross-section of the intermediate portion being concave, the intermediate portion having inwardly extending walls of sufficient extent to define a restricted passage opening in the general direction of the longitudinal concavity, the free edges of said walls being spaced a substantial distance throughout its entire extent inwardly of a common plane of the outer ends of the flat portions, one end of the plate extending inwardly to form a wall.

5. A fishing lure, comprising a substantially rigid plate having a general outline in plan of substantially oval shape, the plate being narrow with relation to its length, and the plate having an intermediate curved portion and flat portions merging from the intermediate portion on opposite sides thereof to form a longitudinal concavity, the flat portions being at an obtuse angle to each other, the opposed edges of the plate at the intermediate portion extending sharply downwardly and inwardly out of said substantially oval outline to provide inwardly extending walls of sufficient extent to define a restricted passage opening in the general direction of the longitudinal concavity so that the transverse cross-section of the intermediate portion is concave, the edges of the inwardly extending walls being shaped to flow without interruption into the lower faces of said flat portions.

6. A fishing lure, comprising a substantially rigid plate having a general outline in plan of substantially oval shape, the plate being narrow with relation to its length, and the plate having a bend at an intermediate position to provide a pair of substantially flat portions extending away from the intermediate bend on opposite sides thereof to form a longitudinal concavity bounded by the flat portions, the flat portions defining an obtuse angle between them, the opposed edges of the plate at the bend extending sharply downwardly and inwardly toward each other to define indentations in the otherwise substantially oval outline, and to provide inwardly extending walls of sufficient extent to define a restricted passage spaced inwardly from the substantially oval outline and opening in the general direction of the longitudinal concavity so that the transverse cross-section of the intermediate portion is substantially U-shape.

7. A fishing lure, comprising a substantially rigid plate having a general outline in plan of substantially oval shape, the plate being narrow with relation to its length, and the plate having an intermediate curved portion and flat portions merging from the intermediate portion on opposite sides thereof to form a longitudinal concavity, the flat portions being at an obtuse angle to each other, the plate adjacent the intermediate portion having cut-outs therein opening rearwardly of the lure and defining fins integral with the plate outwardly of the cut-outs, the intermediate portion between the cut-outs having inwardly extending walls of sufficient extent to define a restricted passage opening in the general direction of the longitudinal concavity so that the transverse cross-section of the intermediate portion between the cut-outs is concave, the free edges of said walls being spaced a substantial distance throughout its entire extent inwardly of a common plane of the outer ends of the flat portions.

8. A fishing lure, comprising a substantially rigid plate having a general outline in plan of substantially oval shape, the plate being narrow with relation to its length, and the plate having an intermediate curved portion and flat portions merging from the intermediate portion on opposite sides thereof to form a longitudinal concavity, the flat portions being at an obtuse angle to each other, the plate adjacent the intermediate portion having cut-outs therein opening rearwardly of the lure and defining fins integral with the plate outwardly of the cut-outs, the intermediate portion between the cut-outs having inwardly extending walls of sufficient extent to define a restricted passage, the passage opening and the fins being bent downwardly in the general direction of the longitudinal concavity so that the transverse cross-section of the intermediate portion between the cut-outs is concave, the free edges of said walls being spaced a substantial distance throughout its entire extent inwardly of a common plane of the outer ends of the flat portions.

STEPHEN L. JEZERSKI.

REFERENCES CITED

The following references are of record in the file of this patent:

UNITED STATES PATENTS

| Number | Name | Date |
|---|---|---|
| 1,575,139 | Wiesenfeld | Mar. 2, 1926 |
| 1,589,860 | Pealer | June 22, 1926 |
| 1,866,465 | Harrington et al. | July 5, 1932 |
| 1,938,653 | Bardon | Dec. 12, 1933 |
| 2,238,292 | Schavey | Apr. 15, 1941 |